Figure 1:
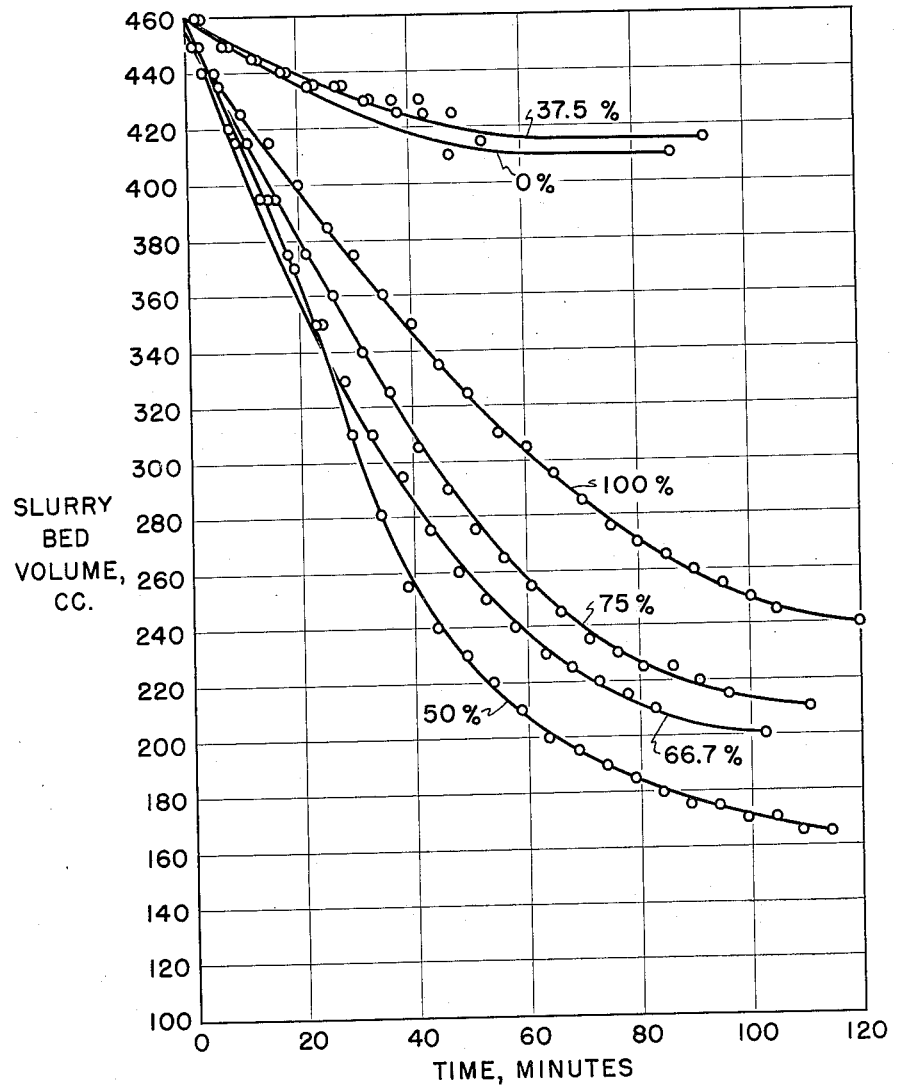

Arthur W. Langer, Jr.
Charles M. White — Inventors

United States Patent Office 3,001,976
Patented Sept. 26, 1961

3,001,976
RECOVERY OF HIGH MOLECULAR WEIGHT OLEFIN POLYMERS
Arthur Walter Langer, Jr., and Charles Marlin White, Baton Rouge, La., assignors to Esso Research and Engineering Company, a corporation of Delaware
Filed May 17, 1957, Ser. No. 659,855
5 Claims. (Cl. 260—93.7)

The present invention relates to the polymerization of olefins. More particularly, the invention relates to the polymerization of olefins of three to four carbon atoms at relatively low pressures for the production of polymers of high molecular weight.

Specifically, the invention is directed to an improved method of separating the polymer from the liquid used to wash the catalyst from the polymer. Basically, this is accomplished in accordance with the invention by washing the catalyst from the polymer with controlled mixtures of an alcohol and a hydrocarbon and separating the polymer by centrifuging.

Prior to the present invention it has been known that propylene, butene-1, etc. can be polymerized at relatively low pressures not substantially exceeding atmospheric pressure when using various combinations of reducing metals or metal compounds, e.g., alkali and alkaline earth metals, their hydrides and alloys; aluminum compounds, such as aluminum hydride, aluminum alkyls, e.g., trialkyls, alkyl aluminum halides, etc., with various reducible heavy metal compounds, such as the halides, acetyl acetonates, etc., of the metals of groups IV–VI and VIII of the periodic system, e.g., of titanium, zirconium and iron. In this reaction, the gaseous olefin is contacted with the catalyst suspended and/or dissolved in a liquid solvent or diluent, usually a hydrocarbon such as heptane.

Among the most active types of catalysts for this reaction are combinations of trialkyl aluminum or dialkyl aluminum halides with titanium tetrahalide, trihalide or dihalide. More specifically, excellent results have been obtained when using combinations of triethyl aluminum, diethyl aluminum chloride, or aluminum ethyl dichloride or mixtures thereof with a titanium chloride, obtained by simply mixing the catalyst components at atmospheric temperature in suitable solvents. These catalysts have been found to give high yields of good quality, high molecular weight, solid, high softening point polymers even as low as atmospheric pressure.

The molar ratio of the aluminum compound or other reducing agent to the heavy metal compound in the catalyst mixture may vary widely but is generally about 0.2/1 to 12/1 although ratios of 6/1 to 1/1 are suitable in many cases.

The polymerization process is carried out over a wide range of temperatures, preferably between about 30° and 500° F. or even more preferably between 70° and 200° F. Pressures may range from atmospheric or sub-atmospheric to 250 atmospheres. Preferably the pressures range from 0 to 500 pounds per square inch (p.s.i.g.).

The reaction is preferably carried out under careful exclusion of oxygen while stirring under batch or continuous operation. Solvents are generally used to permit stirring after the formation of substantial amounts of solid polymer. These solvents, which should be liquid at the operating conditions, are generally the straight chain paraffins, isoparaffins or naphthenic hydrocarbons, such as pentane, hexane, heptane, nonane, octane, alkylate bottoms ($C_{12}$ hydrocarbons obtained as residue in the distillation of the product obtained by alkylating isoparaffins with olefins), methylcyclohexane or in short any $C_5$ to $C_{12}$ aliphatic or naphthenic hydrocarbon having a specific gravity less than 0.80.

The amount of catalyst used may vary within wide limits depending on the purity of the olefin feed and the diluent. Proportions of as little as 0.1 part by weight per 1000 parts by weight of olefin are sufficient if the feed is pure. Generally, however, catalyst proportions of 0.5 to 5% are adequate.

The monomers employed for the purposes of the present invention include propylene, butene-1, and isobutylene. The polymers produced have molecular weights above 2000 and may range as high as from 300,000 to 3,000,000 or more. The polymer has a density of 0.84 to 0.96, usually about 0.87 to 0.92, and forms as a solvated slurry in the hydrocarbon diluent and is contaminated with catalyst which must be deactivated and removed.

It has been the practice to deactivate the catalyst by the addition, to the slurry of polymer in reactor diluent, of acetyl acetone in an amount equal to 1 to 3 times the stoichiometrical amount needed to complex with the catalyst. Alcohols such as isopropyl or n-butyl alcohol have also been used alone or in conjunction with the acetyl acetone to precipitate the polymer. The alcohols have been employed in amounts of about 1 to 100 times the amount of catalyst used. The deactivated mixture has usually been filtered and the resulting filter cake then reslurried with a wash liquid such as an alcohol at about 120–200° F. for about 15 to 60 minutes to dissolve the catalyst from the polymer. The slurry has then been filtered and the cake reslurried as often as necessary to reduce the catalyst content to the desired low level. After the final filtration the filter cake has been dried, preferably under reduced pressure.

It has been suggested that the polymer be separated from the wash liquid, particularly after the first filtration by centrifuging rather than by filtering in order to increase throughput and decrease equipment costs. However, polypropylene and polybutene (density 0.84 to 0.96) are highly solvated with the hydrocarbon diluent (density 0.62 to 0.75) which has a density less than that of the alcohol (density 0.78 to 0.81) used to wash out the catalyst. As a result the density of the solvated polymer approaches that of the alcohol and the centrifugal separation becomes difficult.

It has now been found that improved results can be obtained and the polymer easily separated from the wash liquid by the use of a controlled mixture of a hydrocarbon and an alcohol to wash out the catalyst followed by centrifuging. The alcohol may be any $C_1$ to $C_4$ alcohol, such as methanol, ethanol, isopropanol, normal butanol, secondary butanol and the like. The hydrocarbon may be any of those described above as a diluent in the polymerization. In order to obtain complete separation by centrifugation the alcohol must be used in sufficient proportions to give an alcohol-hydrocarbon mixture containing 40–75 vol. percent alcohol. If desired, it may be added to the reactor effluent in the proper proportions whereby even the first separation may be by centrifugation.

In accordance with the invention therefore, the reactor effluent containing a slurry of solvated polymer in hydrocarbon is contacted with 1 to 3 wt. equivalents of acetyl acetone based on catalyst. A $C_1$ to $C_4$ alcohol may then be added to precipitate the polymer and wash out the catalyst. If the alcohol is added in the correct amounts to give an alcohol-hydrocarbon mixture containing 40–75 vol. percent of alcohol the mixture can be easily centrifuged. If the mixture is filtered instead it is found that when the filter cake is reslurried in pure alcohol to wash out further amounts of catalyst the mixture cannot be separated by centrifugation, or at best only slowly. However, if a hydrocarbon, such as normal heptane, etc., is added in sufficient amounts to give an alcohol-hydrocarbon mixture containing 40–75% alcohol, the mixture can be centrifuged easily. In this manner any number of centrifugal stages can be used.

The invention will be more fully understood from the following data which are given by way of example but not of limitation.

*Example I*

Propylene was polymerized at 150° F. in the presence of a mixture of titanium trichloride and aluminum triethyl in which the aluminum-titanium ratio was 2/1. Heptane was present as a diluent. The polymer formed as a slurry in the heptane. After removing the slurry from the reactor 2 mols of acetyl acetone per mol of catalyst were added to complex the catalyst, after which the polymer was completely precipitated by the addition of isopropyl alcohol, filtered and dried. The dry polymer was slurried with 2 parts by weight of heptane and 44 g. samples were mixed with 400 cc. portions of various diluent mixtures of n-heptane and isopropyl alcohol to make a 460 cc. slurry containing 4–5 wt. percent polymer (75 wt. percent heptane insoluble) and settled in a 500 cc. graduate. The following data were obtained:

| Vol. Percent Isopropanol in Diluent Mixture | Settling Time, Minutes | Solids Level (from top) | | Settling Rate, Inch/Min. |
|---|---|---|---|---|
| | | cc. | In. | |
| 0 | 22 | 25 | .555 | 0.0252 |
| 37.5 | 23 | 25 | .555 | 0.0241 |
| 50 | 29 | 150 | 3.33 | 0.115 |
| 66.7 | 28 | 130 | 2.89 | 0.103 |
| 75 | 41 | 150 | 3.33 | 0.0813 |
| 100 | 45 | 120 | 2.67 | 0.0594 |

Figure 2:
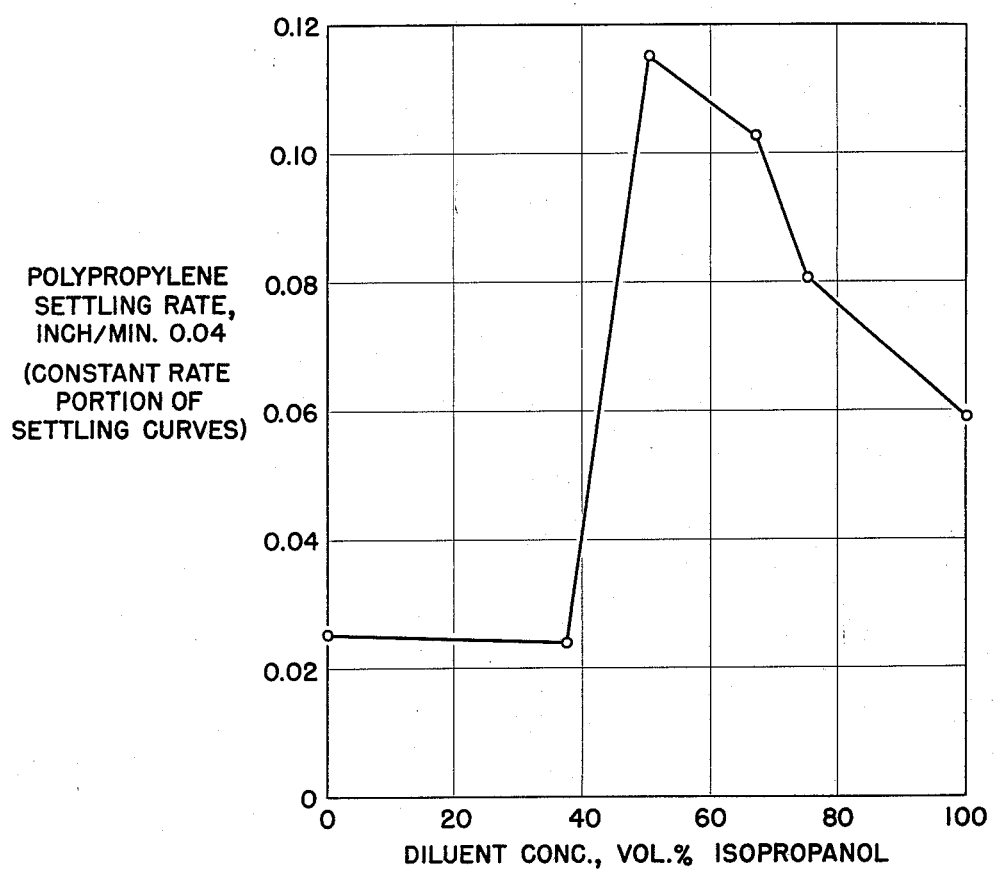

The settling data, when plotted using the slurry bed volume in cc. as ordinate and time in minutes as abscissa, give a series of curves (FIGURE 1) having the alcohol concentration as parameter. These curves show that the three lowest curves give acceptable settling times. When the constant rate portions of these curves are used to calculate the settling rate in inches per minute as shown in last column of the above table and plotted against the volume percent of isopropanol in the diluent, a curve is obtained (FIGURE 2) which indicates a maximum settling rate at 50% concentration of isopropyl alcohol.

*Example II*

Slurries of polypropylene in isopropyl alcohol and 2/1 isopropyl alcohol-heptane mixtures were prepared and centrifuged at 4000 and 6000 r.p.m. in a continuous centrifuge. The following data were obtained:

| Run | Vol. Percent Isopropanol | Wt. Percent of Polymer | | Rate of Polymer Separation, Lbs./Hr. | Centrifuge Speed, r.p.m. |
|---|---|---|---|---|---|
| | | In Slurry | In Separated Diluent | | |
| 1 | 100 | 2.5–3.0 | 0 | 0.1 (Max.) | 4,000 |
| 2 | 100 | 2.5–3.0 | 0 | 0.5 (Max.) | 6,000 |
| 3 | 67 | 2.5–3.0 | 0 | 4.1 (Max.) | 6,000 |

In the above data, runs 1, 2 and 3 show the maximum rates at which complete separation of polymer from wash diluent was obtained. Comparison of runs 2 and 3 show a 7–8 fold increase in centrifugation rate when using a 2/1 alcohol-heptane mixture over that obtained when using pure alcohol.

*Example III*

Dry polymer was prepared as in Example I and slurried in normal heptane to give a slurry containing 13.5 wt. percent of polypropylene. 5 cc. of this slurry was added to 200 cc. of various alcohol and alcohol-hydrocarbon mixtures. The following data were obtained:

| Diluent | Time Req. for Polymer Bed to Reach 50 cc. Vol. |
|---|---|
| 67.5–32.5 Isopropyl alcohol-alkylate bottoms | 3 min. |
| Butanol | 6 min. |
| 75–25 Butanol-isopentane | 2 min. |
| 50–50 Butanol-isopentane | 2–3 min. |
| Isopentane | >24 hours. |
| Isopropyl alcohol | 12 min. |
| 50–50 isopropyl alcohol-heptane | 2 min. |
| Heptane | >24 hours. |

The data in Examples I and II show that mixtures of alcohol and n-heptane containing 40–75% alcohol offer unexpected advantages as wash liquids for polypropylene because of the ease of separating the polymer from such mixtures. The data in Example II show that centrifugal separation can only be accomplished at feasible rates by the use of these mixtures. Example III shows that other alcohol-hydrocarbon mixtures also give excellent settling times compared with the pure alcohol and hydrocarbon.

The nature of the present invention having been thus fully set forth and specific examples of the same given, what is claimed as new and useful and desired to be secured by Letters Patent is:

1. In a process in which $C_3$ to $C_4$ olefin hydrocarbons hydrocarbon diluent chosen from the group consisting with a catalyst comprising a reducing metal compound of a metal of the group consisting of groups I, II and III of the periodic table and a reducible metal compound of a heavy metal of the group consisting of groups IV, V, VI and VIII of the Periodic Table in the presence of a hydrocarbon diluent chosen from the group consisting of the $C_5$ to $C_{12}$ paraffinic and naphthenic hydrocarbons having specific gravities of about 0.60 to about 0.80 and in which a reactor effluent is obtained which contains a slurry of polymer particles solvated with the hydrocarbon diluent and contaminated with catalyst and in which the polymer slurry is contacted with a catalyst deactivating agent and the polymer filtered from the slurry, the improvement which comprises washing the catalyst from the filtered polymer with a mixture of a $C_1$ to $C_4$ alcohol and a $C_5$ to $C_{12}$ hydrocarbon chosen from the group consisting of paraffinic and naphthenic hydrocarbons, said mixture containing 40 to 75 volume percent of alcohol, and centrifuging the mixture.

2. Process according to claim 1 in which the alcohol is isopropyl alcohol and the hydrocarbon is heptane.

3. Process according to claim 1 in which the alcohol is butyl alcohol and the hydrocarbon is a pentane.

4. The process of claim 1 wherein the reducing metal compound is an organo aluminum compound and the reducible metal compound is a titanium compound.

5. The process of claim 1 wherein the reducing metal compound is a trialkyl aluminum compound and the reducible metal compound is a titanium halide.

References Cited in the file of this patent

UNITED STATES PATENTS

| 2,827,447 | Nowlin | Mar. 18, 1958 |
| 2,833,755 | Coover | May 6, 1958 |
| 2,838,477 | Roelen | June 10, 1958 |
| 2,910,461 | Nowlin et al. | Oct. 27, 1959 |
| 2,913,446 | Cull et al. | Nov. 17, 1959 |
| 2,913,447 | Hofheim et al. | Nov. 17, 1959 |
| 2,915,514 | Denkowski | Dec. 1, 1959 |

FOREIGN PATENTS

| 538,782 | Belgium | Dec. 6, 1955 |

UNITED STATES PATENT OFFICE
CERTIFICATE OF CORRECTION

Patent No. 3,001,976                 September 26, 1961

Arthur Walter Langer, Jr., et al.

It is hereby certified that error appears in the above numbered patent requiring correction and that the said Letters Patent should read as corrected below.

Column 4, line 30, for "hydrocarbon diluent chosen from the group consisting" read -- are polymerized to high molecular weight by contacting --.

Signed and sealed this 6th day of March 1962.

(SEAL)
Attest:

ERNEST W. SWIDER
Attesting Officer

DAVID L. LADD
Commissioner of Patents